United States Patent Office 3,119,860
Patented Jan. 28, 1964

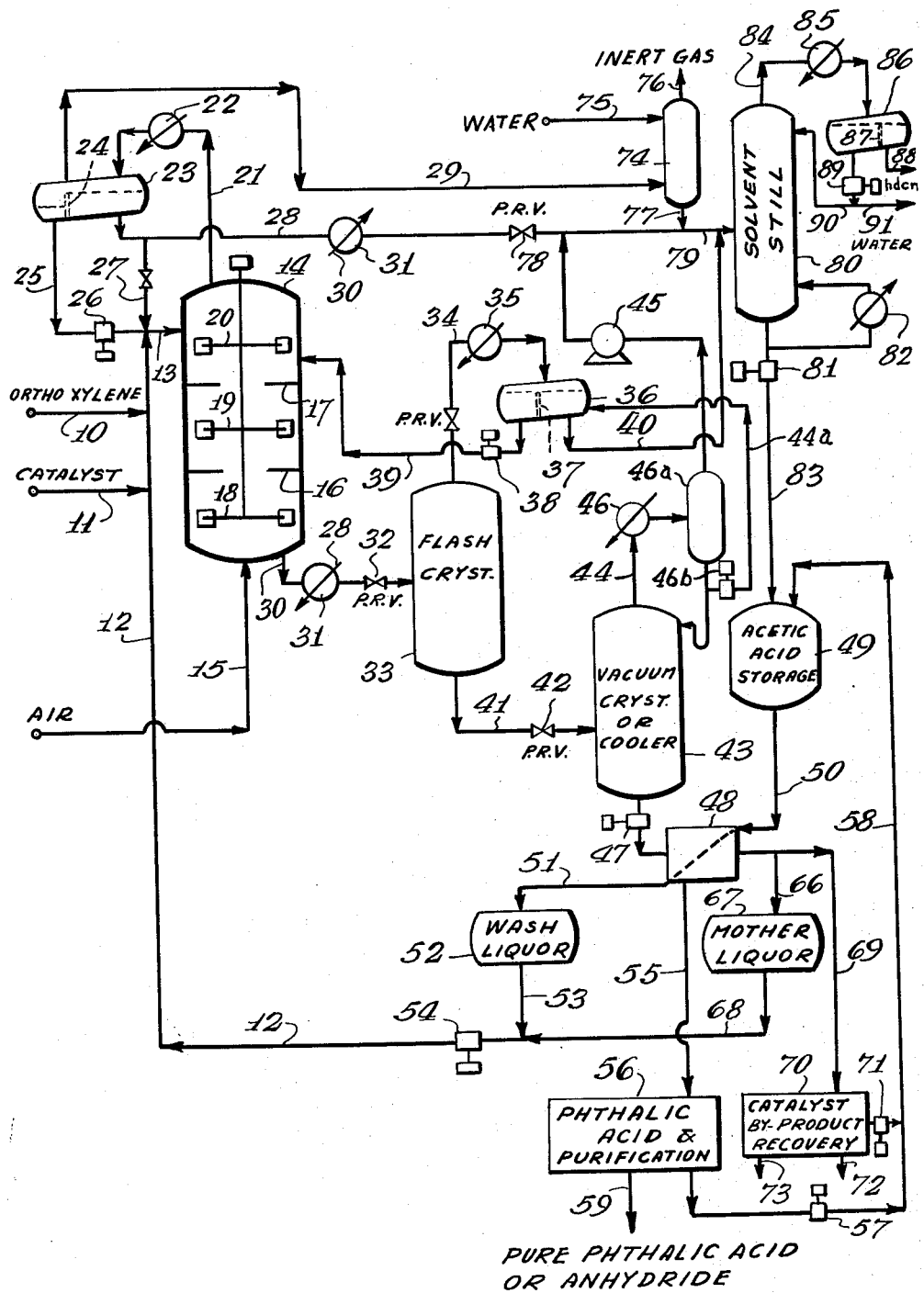

3,119,860
CONTINUOUS SUBSTITUTED AROMATIC HYDROCARBON OXIDATION, ACID CRYSTALLIZATION AND ACID RECOVERY SYSTEM
Charles D. Kalfadelis, Hammond, Ind., Charles A. Spiller, Jr., Maplewood, N.J., and Richard H. Baldwin, Chicago, Ill., assignors to Standard Oil Company, Chicago, Ill., a corporation of Indiana
Filed Aug. 12, 1957, Ser. No. 677,593
6 Claims. (Cl. 260—524)

This invention relates to a continuous system for oxidizing an aromatic hydrocarbon having at least one and preferably two or more oxidizable substituents into a product which is soluble in reaction medium under oxidizing conditions, and the invention pertains to an improved system for effecting said oxidation as well as the subsequent crystallization and recovery of aromatic carboxylic acids thus produced. The invention will be described as applied to the production of high quality phthalic acid from orthoxylene.

The object of the invention is to provide a substituted aromatic hydrocarbon oxidation system, together with aromatic acid crystallization and recovery systems, which is less expensive to build and operate and, at the same time, which gives higher yields of higher quality product than can be obtained by oxidation systems heretofore known to the art. A particular object is to provide improved solvent handling and crystallization facilities in an integrated aromatic carboxylic acid plant. A further object is to provide a system which may be employed for the production of a large number of aromatic carboxylic acids from the corresponding substituted aromatic hydrocarbon charging stocks, in other words, to provide a system which is not limited to particular charging stocks and conditions but is more flexible than any previously known technique for making aromatic carboxylic acids. Other objects will be apparent as the detailed description of the invention proceeds.

In practicing the invention an aromatic hydrocarbon having at least 1 and preferably at least 2 oxidizable substituents such, for example, as a substantially pure orthoxylene is continuously oxidized with an oxygen-containing gas such as air in a countercurrent oxidation zone which is maintained at a pressure in the range of about 50 to 500 p.s.i. and preferably about 200 to 350 p.s.i at a temperature in the range of about 325 to 425° F. and preferably about 350 to 400° F. for an average contacting period of about .2 to 2 hours or more, the oxidation system preferably consisting of a plurality of stages in each of which sufficient agitation is maintained to provide intimate contact between liquid phase reaction medium and the oxidizing gas. The reaction is carried out in the presence of a solvent which is preferably a mono-basic aliphatic reaction medium of 2 to 6 carbon atoms such, for example, as acetic acid which may be present in amounts of about .3:1 to 3:1 on a volume basis based on hydrocarbon charging stock. The highest pressure, temperature and oxygen concentration is at the product end of the oxidizing zone for insuring maximum conversion and minimum degradation and by-product formation.

Since the phthalic acid produced by orthoxylene oxidation (in the presence of known oxidation catalysts and a bromine-affording substance) is soluble in the acetic acid, the oxidation product effluent is cooled and introduced into a low pressure zone for effecting further cooling and removal of reaction medium which serves as a solvent. Usually a plurality of pressure reduction and crystallization steps are desirable, the final step preferably being at subatmospheric pressure. The solvent removed in the flash chilling and/or crystallization steps may contain water, solvent (mono-basic aliphatic carboxylic acid reaction medium) and hydrocarbons, substantially all of the latter together with a part of the aqueous reaction medium being returned to the reactor while the net amount of aqueous reaction medium is sent to a solvent still for recovering acid reaction medium in substantially anhydrous form. The finally crystallized product may be washed with acid reaction medium such as substantially anhydrous acetic acid for effecting final purification and any residual amounts of the acid medium may be removed from the product crystals in an inert drying gas system.

When mixtures of substituted aromatic hydrocarbons are employed as a charging stock, it may be desirable to employ three or even more stages of flash cooling and crystallization and in such cases the product may be a mixture of aromatic carboxylic acids which can be subsequently separated into relatively pure individual acids. For example, when the hydrocarbon charging stock is a mixture of $C_8$ aromatics obtained by solvent extraction of hydroformed naphtha, three crystallizing zones are preferably employed. The first may be operated at a pressure of about 75 p.s.i.g. plus or minus 25 p.s.i., at a temperature of about 350° F., the second may be operated at a pressure of about 1 or 2 p.s.i.g. and a temperature of 235° F., and the third may be operated at a pressure of about 110 millimeters of mercury at a temperature of about 140° F. In the first crystallizing zone relatively large crystals of the most insoluble product are formed and crystals of the next more soluble product are nucleated. In the second zone the nucleated crystals are grown to large size while a still more soluble product is nucleated. In the final vacuum crystallizing zone, it is preferred to effect crystal growth of any remaining phthalic acids at a temperature just above that at which benzoic acid would be nucleated.

At least a part of the mother liquor separated from product crystals is withdrawn to prevent buildup of undesirable by-products in the conversion system, the valuable components of said withdrawn mother liquor being suitably recovered and utilized. Water and reaction medium are continuously removed from the reactor to prevent the concentration of reaction medium from dropping below 80 percent by weight and although the vapors withdrawn from the reactor for temperature control purposes include hydrocarbons, substantially all of these hydrocarbons and a portion of the condensed aqueous reaction medium are returned to the oxidation reactor.

The invention may be more clearly understood from the following detailed description of a specific example read in conjunction with the accompanying drawing which is a schematic flowsheet of our improved continuous oxidation and aromatic acid recovery system.

The substituted aromatic hydrocarbon which is to undergo oxidation, orthoxylene in this example, is introduced through line 10 at a controlled temperature along with catalyst and bromine-affording substance introduced by line 11 and recycled acetic acid reaction medium from line 12, the mixture being introduced through line 13 to the upper part of reaction vessel 14. Air is introduced at the base of the reactor through line 15 in an amount sufficient to give an amount of oxygen slightly in excess of 3 mols per mol of orthoxylene charged. The oxidation is effected in vessel 14 at a pressure of about 300 p.s.i. and at an average temperature of about 375° F. for a holding time of approximately 1 hour. In this example the amount of acetic acid introduced via line 12 is approximately twice the amount of fresh orthoxylene introduced through line 10 and the amount of catalyst, which is manganese bromide in this example, is approximately 1.5 weight percent based on fresh orthoxylene charge.

No novelty is claimed per se in the catalyst or in the catalyst promoter employed in this invention since the invention is an improvement in a particular promoted catalyst system recently perfected by others. The catalyst is a multi-valent or heavy metal, preferably in a form which is soluble in the reaction medium or solvent. The catalyst metal may advantageously be selected from the group consisting of manganese, cobalt, nickel, chromium, vanadium, molybdenum, tungsten, tin, cerium, or mixtures thereof, and the metal may be employed in elemental, combined, or ionic form, preferably in the form of acetate when the reaction medium or solvent is acetic acid. The promoter is a substance affording bromine, the bromine being in elemental, ionic, organic, or inorganic form. Thus the bromine may be employed in the form of potassium bromate, ammonium bromide, benzyl bromide, tetrabromoethane, manganese bromide or the like. The proportions of catalyst and promoter may be approximately stoichiometric as exemplified by manganese bromide and generally are in the range of 1:10 to 10:1 atoms of catalyst metal per atom of bromine. The amount of catalyst employed is usually in the range of about .01 to 10 percent or more and is preferably in the range of about .2 to 2 percent by weight based on aromatic hydrocarbon reactant charged. The preferred mixed metal catalysts are mixtures of manganese in the form of bromide or acetate with ammonium molybdate, ammonium chromate, tungstic acid, cobalt acetate, or the like, the proportions usually being about 1 to 2 parts by weight of the manganese salt per part by weight of the other metal compound. Alternatively, of course, the catalyst metals may be employed as salts of an acid which is being produced in the system.

The reactor in this example is a three-stage vertical cylindrical vessel with spaced doughnut baffles 16 and 17 for partitioning the total reactor space into three zones. Impellers 18, 19 and 20 are rotatably mounted in each zone for effecting intimate contact of charging stock and reaction medium with the oxidizing gas, the use of an impeller mixer is not essential if sufficiently intimate contact is otherwise obtained.

Instead of employing a single oxidation vessel 14, we may employ two or more of such oxidation vessels operated at corresponding temperature and pressure and we may pass the uncondensed gases from each of the downstream reactors into the reactor which precedes it together with an amount of air which is so controlled that none of the off gases have an oxygen content higher than about 8 volume percent. In such a multi-reactor system it is preferable to effect temperature control by withdrawing vapors from each reaction vessel, a considerable amount of the water and acetic acid from the later vessels being returned with the gas stream to the earlier vessels and the net amount of water produced being withdrawn from the first reaction vessel. This continuous multi-vessel oxidation system is not shown in the drawing which is simplified to avoid confusion.

Temperature control is effected in vessel 14 by withdrawing vapors through line 21 and cooler 22, the condensate and uncondensed gases being introduced into receiver 23 which is provided with a dam or weir 24. Condensed hydrocarbons flow over weir 24 together with a certain amount of aqueous acetic acid and this mixture is returned by line 25, pump 26 and line 13 to vessel 14. Alternatively or in addition, condensate may be returned through valved conduit 27, the net amount of produced water together with dissolved acetic acid being withdrawn through line 28. Uncondensed vapors leave receiver 23 through line 29.

Reaction product effluent is withdrawn from the base of vessel 11 through line 30, cooler 31 and pressure reducing valve 32 to flash crystallization vessel 33 which in this example is operated at about 50 p.s.i.g. Vapors removed from vessel 33 by line 34 are passed through cooler 35 to receiver 36 which is provided with a weir or dam 37. Usually a pressure reducing valve is employed in line 34 and receiver 36 is operated at approximately atmospheric pressure. Hydrocarbons which flow over weir 37 and a part of the aqueous acetic acid condensate are withdrawn from receiver 36 by pump 38 and returned by line 39 back to reaction vessel 14. Aqueous acetic acid is withdrawn from receiver 36 by line 40 for recovery of the acetic acid.

The partially crystallized product stream leaves the base of vessel 33 through line 41 and pressure reducing valve 42 to vacuum crystallization vessel 43 which in this example is operated at a pressure of about 100 millimeters of mercury absolute, vapors being withdrawn through line 44 through condenser 46 into vessel 46a by vacuum pump 45. Some of the condensate from vessel 46a is returned directly to crystallizer 43 and the remainder is pumped into receiver 36 through line 44a. Thus receiver 36 is utilized to recover unreacted hydrocarbon from both crystallizing vessels 33 and 43, respectively.

Crystal slurry is pumped from the base of vacuum crystallizer 43 by means of pump 47 to a filter or centrifugal separator 48, the separated crystals being then washed with substantially pure acetic acid which is introduced from storage tank 49 through line 50 to the separation stage and is thence conducted through line 51 to wash liquor storage tank 52 for recycle by line 53 and pump 54 via line 12 back to the oxidation reactor. The acetic acid-washed phthalic acid crystals may be passed by line 55 to final purification system 56 from which acetic acid may be recovered by known means and recycled by pump 57 and line 58 to acetic acid storage tank 49, the substantially pure phthalic acid or phthalic anhydride being withdrawn through line 59.

About two-thirds of the mother liquor in this case is introduced by line 66 to mother liquor storage vessel 67 and is thence recycled by line 68, pump 54 and lines 12 and 13 to oxidation vessel 14. When mixed acids are employed as a charge, a much lesser amount, of any, of the mother liquor may thus be recycled. At least a part of the mother liquor is withdrawn through line 69 to catalyst and by-product recovery system 70. Acetic acid from such system may be removed by line 71 to line 58 or aqueous acetic acid may be sent to the solvent still hereinafter described. Any ethylbenzene in the charge is converted to benzoic acid which may be removed through line 72. Any unreacted hydrocarbons or partially oxidized hydrocarbons (toluic acid) may be returned by line 73 to vessel 14 or withdrawn from the system. Other catalyst and by-product material is eliminated from the system at this point.

The gas stream which leaves receiver 23 through line 29 is introduced to scrubber 74 wherein acetic acid is removed therefrom by water introduced through line 75 so that the inert gases which are vented through line 76 contain no acid. Aqueous acetic acid withdrawn through line 77 is combined with aqueous acid withdrawn through line 40 and through line 28 (which includes pressure reduction valve 78), each of said streams being conveyed by line 79 to solvent still 80. The aqueous acid condensate in line 28 may be passed through heat exchanger 31 for cooling oxidation reactor effluent and heating the aqueous acid which is introduced to the solvent still. Acid is withdrawn from the base of the solvent still by pump 81, a part being recycled through reboiler-heater 82 and a part passed by line 83 to acetic acid storage 49. Water and any hydrocarbons which may be present are withdrawn from still 80 through line 84 in vapor form and thence passed through cooler 85 to receiver 86 which is provided with weir 87. Any hydrocarbons azeotroped with the water may be removed through line 88. Water is removed by pump 89, a part of it being returned by line 90 for reflux in the solvent still and the remainder discarded by line 91.

From the foregoing it will be observed that our system is uniquely advantageous for the production of aromatic carboxylic acids which are soluble in the reaction medium under oxidizing conditions. With sufficiently soluble products the oxidation zone effluent may be passed through a cooler and through a pressure reduction valve without danger of plugging lines, valves or equipment on account of instantaneous crystallization or buildup of crystals. Crystal accumulation on surfaces of valves, pipes or vessels may be avoided by coating the surfaces of said valves, pipes and vessels with tetrafluoroethylene polymer, commonly known as Teflon, since aromatic carboxylic acid crystals do not adhere to Teflon. Instead of or in addition to the use of flash crystallization vessels, continuous coolers of the scraped surface exchanger type may be employed, this technique offering the advantage of enabling a close control of chilling rate during any selected part of a chilling operation. In some instances it may even be desirable to add a solvent, diluent or crystallization medium at a particular stage in the cooling operation although usually crystallization is promoted by removal of the solvent, acetic acid, which constitutes the reaction medium. Provision may be made for employing a screw extruder for conveying the crystal slurry through a cooler or for removing crystals from the base of a reactor or crystallizer in order that a large pressure differential may be maintained between a particular vessel and a discharge zone. In systems wherein passage of a crystal slurry through a pressure reducing valve is not feasible, it will be understood, of course, that piston-type slurry metering and displacement may be employed or any other known means for transferring a slurrry to a zone of lower pressure.

The temperature in the crystallization zones and in the final separation and washing zones will, of course, be dependent upon the particular aromatic carboxylic acid product or product mixture which is being produced. Usually the oxidation is effected at a temperature of the order of 350 to 400° F. and the oxidized product is subjected to gradual or step-wise cooling to an ultimate temperature of the order of about 50 to 150° F. The drying of acetic acid-washed aromatic carboxylic acid product may be effected at a temperature of the order of about 250 to 300° F.

While the invention has been described as a system for producing phthalic acid from orthoxylene, it should be understood that the invention is applicable to the oxidation of any aromatic hydrocarbon having 1 or more, and preferably at least 2, oxidizable substituents where at least a portion of the product is highly soluble in the acid reaction medium employed in the reaction zone so that pressure reduction and cooling are necessary for ultimate product recovery. Examples of oxidizable substituted aromatic hydrocarbons and the acids obtained therefrom are as follows:

| | |
|---|---|
| Methylbenzene | Benzoic. |
| 1,2-dimethylbenzene | Phthalic. |
| 1,3-dimethylbenzene | Isophthalic. |
| 1,4-dimethylbenzene | Terephthalic. |
| 1,2,3-trimethylbenzene | Hemimellitic. |
| 1,2,4-trimethylbenzene | Trimellitic. |
| 1,3,5-trimethylbenzene | Trimesic. |
| 1,2,3,4-tetramethylbenzene | Prehnitic. |
| 1,2,4,5-tetramethylbenzene | Pyromellitic. |
| 1,2,3,5-tetramethylbenzene | Mellophanic. |
| Pentamethylbenzene | Benzenepentacarboxylic. |
| Hexamethylbenzene | Mellitic. |
| p-Diisopropylbenzene | Terephthalic. |
| m-Diisopropylbenzene | Isophthalic. |
| 1,3,5-triisopropylbenzene | Trimesic. |
| 1,3-dimethyl-5-ethylbenzene | Do. |
| 1-methylnaphthalene | α-Naphthoic acid. |
| 2-methylnaphthalene | β-Naphthoic acid. |
| 3-methylpyridine | Nicotinic acid. |

In all cases the oxidation is preferably effected in the presence of known oxidation catalysts and also in the presence of a bromine-affording substance; this type of oxidation not only results in minimizing degradation and by-product formation but it enables the use of air or other oxidizing gas as the oxidizing medium and hence minimizes the presence in the final products of certain of the impurities which are usually present in oxidation processes produced by other techniques. The temperatures, pressures, contact times and so forth will, of course, be dependent upon the particular charging stock employed and the nature and purity of the desired acid product. A specific example of our invention has been described in considerable detail and various alternative arrangements, steps and conditions will be apparent from said description to those skilled in the art.

We claim:

1. In the process of converting a polyalkyl aromatic compound into at least one aromatic polycarboxylic acid product in the presence of a normally liquid monocarboxylic acid solvent having 2 to 6 carbon atoms per molecule wherein said polyalkyl aromatic compound is contacted with an oxygen-containing gas in the presence of such solvent, an oxidation catalyst and a bromine-affording substance in at least one oxidizing zone at an average temperature in the range of about 325 to 425° F. under average pressure in the range of about 50 to 500 p.s.i. with a charging stock holding time in the range of about .1 to 3 hours, the improved method of operation which comprises cooling oxidation zone effluent product stream, reducing the pressure on the cooled product stream to a level which is below the oxidizing pressure but above atmospheric pressure and holding said stream in a crystallizing zone at said reduced pressure to permit the growth of aromatic polycarboxylic acid product crystals and thereby obtain a product crystal slurrry, reducing the pressure on the product crystal slurry while introducing it from said first crystallizing zone to a second crystallizing zone which is at subatmospheric pressure, holding the slurry in the second crystallizing zone to permit further crystal growth, centrifuging said slurry to remove mother liquor from crystals, and continuously withdrawing vapors from at least one of the crystallizing zones for effecting both concentration and refrigeration of liquid contained therein.

2. The method of claim 1 wherein the pressure in the second crystallizing zone is maintained at a pressure of about 100 millimeters of mercury.

3. The method of claim 1 which includes the step of condensing vapors withdrawn from the crystallizing zone and returning a part of the condensed vapors to the oxidizing zone.

4. The method of claim 3 which includes the step of separating condensed vapors into a hydrocarbon-acid phase and an aqueous acid phase and returning the hydrocarbon-acid phase to the oxidizing zone.

5. The method of claim 2 which includes the step of indirectly contacting the oxidation zone effluent product stream with a cooling fluid for crystallizing a part of the product.

6. The method of claim 2 which includes the steps of withdrawing vapors from the oxidizing zone, partially condensing the last named withdrawn vapors, separating the resulting condensate into a hydrocarbon-acid phase and an aqueous phase and returning to the oxidation zone only the hydrocarbon-acid phase and a portion of the aqueous acid phase.

References Cited in the file of this patent

UNITED STATES PATENTS

| | | |
|---|---|---|
| 2,734,914 | McKinnis | Feb. 14, 1956 |
| 2,788,367 | Bills | Apr. 9, 1957 |
| 2,794,832 | Rietema | June 4, 1957 |
| 2,833,816 | Saffer et al. | May 6, 1958 |
| 2,848,488 | Himel et al. | Aug. 19, 1958 |

OTHER REFERENCES

Perry et al.: Chemical Engineer's Handbook, 3rd ed., pp. 1058–70 (1950).